United States Patent

Yamamoto et al.

[11] 4,420,067
[45] Dec. 13, 1983

[54] FRICTION MEMBER OF RESIN MOLD TYPE

[75] Inventors: Yasunobu Yamamoto, Chiryu; Ryoichi Tomikawa; Masami Ishii, both of Toyota, all of Japan

[73] Assignees: Aisin Seiki Kabushiki Kaisha; Aisin Kako Kabushiki Kaisha, both of Kariya, Japan

[21] Appl. No.: 482,013

[22] Filed: Apr. 8, 1983

Related U.S. Application Data

[63] Continuation of Ser. No. 188,265, Sep. 17, 1980, abandoned.

[30] Foreign Application Priority Data

Sep. 17, 1979 [JP] Japan .............................. 54-119013

[51] Int. Cl.³ ........................................... F16D 69/02
[52] U.S. Cl. ........................ 188/251 A; 188/251 M; 192/107 M
[58] Field of Search ...................... 188/251 A, 251 M; 192/107 M

[56] References Cited

U.S. PATENT DOCUMENTS

| | | | |
|---|---|---|---|
| 2,861,964 | 11/1958 | De Gaugue, Jr. et al. | 188/251 M |
| 3,210,303 | 10/1965 | Biggs | 188/251 M |
| 3,269,976 | 8/1966 | Veda | 188/251 M |
| 3,585,102 | 6/1971 | Burgess | 188/251 M |
| 4,197,223 | 4/1980 | Bartram | 188/251 A |
| 4,197,352 | 4/1980 | Emmett et al. | 188/251 A |
| 4,364,997 | 12/1982 | Yamamoto et al. | 192/107 M |
| 4,385,682 | 5/1983 | Yamamoto et al. | 192/107 M |

FOREIGN PATENT DOCUMENTS

505922  5/1939  United Kingdom ........... 192/107 M

Primary Examiner—Douglas C. Butler
Assistant Examiner—R. R. Diefendorf
Attorney, Agent, or Firm—Oblon, Fisher, Spivak, McClelland & Maier

[57] ABSTRACT

A friction member of the resin mold type comprising brass fiber of 1-10 mm length having a trapezoid in cross figure thereof as a base material of the friction member, and a phenolic resin of cement composition, to obtain excellent qualities such as good durability at high temperature.

6 Claims, 2 Drawing Figures

FRICTION MEMBER OF RESIN MOLD TYPE

This application is a continuation of application Ser. No. 188,265, filed Sept. 17, 1980, now abandoned.

BACKGROUND OF THE INVENTION

1. Field of the Invention

This invention relates to an improved friction member, and more particularly to a brake pad of the type used for Motor vehicles.

2. Description of the Prior Art

Friction members of a resin mold type used for motor vehicles (hereinbelow referred to merely as the friction members), are usually made of an asbestos fiber base including a phenolic resin of a cement composition (a binder agent) and some ingredients to improve frictional qualities such as the frictional coefficient and/or durability. The friction members also are contacted with a metal core (a back metal) by an adhesive agent.

The frictional members produced by the conventional method are obtained in the following process which comprises: mixing the asbestos fiber, the binder agent, and some ingredients; preforming with a metal mold at room temperature under pressure contact with the back metal, forming with a metal mold under heat and pressure; smoothing the surface and side face of the formed products to remove the over flowing materials thereform.

However the asbestos fiber is detrimental for our health. Whenever persons produce the friction members, for example in mixing or smoothing steps, a lot of a powdered asbestos is scattered in a factory.

Upon breathing the powdered asbestos, a person's health is impaired and cancer may result.

The friction members comprising steel fiber as a base material have been used recently to remove the problem of asbestos fiber.

However, the friction members comprising the steel fibers easily rust, and portions thereof will peel in the area between the friction member and the back metal.

Thus the aforementioned peeling phenomenon will generate a functional disorder of the brake system.

SUMMARY OF THE INVENTION

Accordingly, one object of this invention is to provide friction members which eliminate the problem of asbestos fiber.

Another object is to prevent peeling between the friction member and the back plate.

Further, another object is to prevent rust generation of the friction members.

Briefly, these and other objects of the invention as hereinafter will become more readily apparent may be attained by providing an improvement in friction members, especially used for the brake systems of motor vehicles, which comprises using brass fiber as a base material, a binder agent, and some frictional ingredients.

DETAILED DESCRIPTION OF THE PREFERRED EMBODIMENTS

Figure 1:
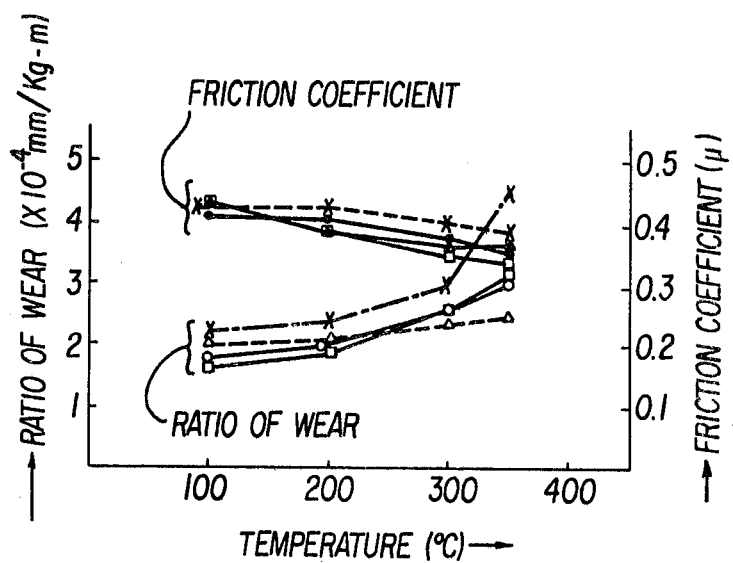
FIG. 1 is a graph showing the ratio of water and the frictional coefficient of the friction member of the invention in comparison with the conventional ratio of wear and the conventional frictional coefficient.

The term "brass fiber" used in the invention, is a fiber obtained by cutting brass materials with an adequate cutting machine such as a lathe. The sectional shape of the brass fiber is generally shown in a trapezoid.

The outer diameter of the brass fiber is about 0.05 to 0.5 mm. The length of the brass fiber is 1 to 10 mm, desirably 2 to 7 mm, most desirably 3 to 6 mm.

The binder agent is one that is suitable on any conventional material, especially a phenolic resin.

The frictional ingredient desirably will be characterized as a lubricant, also improving the frictional coefficient, improving wear durability, and improving heat conductivity. However, the lubricant and improved frictional coefficient are of contradictory qualities. Therefore, when using the frictional material in the invention, some adequate ingredients attaining a geometrical effect are selected and used as required qualities of the friction members. Typical examples of the ingredients improving the frictional qualities are rubber dust, cashew dust, graphite, metal sulfide, a metal oxide, a metal powder and so on.

The friction members of the invention may use cheap materials such as calcium carbonate or a silica to decrease the cost of the filler.

The mixing ratio of the brass fiber is 10 to 70% by weight of all mixing material, desirably 30 to 60% by weight, most desirably 40 to 60% by weight.

The mixing ratio of the phenolic resin is 6 to 15% by weight of all mixing material, desirably 8 to 13% by weight, most desirably 9 to 11% by weight.

The mixing ratio of the ingredients improving the frictional qualities is 20 to 80% by weight of all mixing materials, desirably 30 to 60% by weight, most desirably 40 to 50% by weight.

It is desirable that the mixing ratio of the aforementioned filler is less than 30% by weight of all mixing materials.

The aforementioned disclosure is consistent with using 100% brass fiber as a base material of the friction members. However, inorganic fibers such as ceramic and steel fibers and/or organic fibers such as phenolic and aromatic polyamido fibers can be used as supplementary fibers.

The manufacturing method of the invention involve conventional methods.

A typical example of the manufacturing method mentioned above is as follows:

placing and mixing the brass fiber, some ingredients improving the frictional qualities, and phenolic resin with an adequate mixing device such as a Twin Shell Blender;

pre-forming the mixed product to a required shape with an adequate pre-forming machine such as a compression molding machine, at room temperature under pressure into a metal mold, forming the pre-formed product with an adequate forming machine such as a compression molding machine under heat and pressure, and contacting the back metal with the adhesive agent simultaneously into a metal mold; smoothing the surface and the side face of the formed product to remove the over flowing material therefrom; and then heating the smoothed product, to thereby get the complete friction member.

Small amounts of a phenolic resin or an organic resin may be added in the mixed product, while pre-forming in order to easily conduct the forming step. The preforming step may be abbreviated.

Another method is as follows;

placing and mixing the brass fiber, with some ingredients improving the frictional qualites, and phenolic resin, if needed, adding small amounts of the organic and/or inorganic fibers; then forming the mixed product to a sheet state under heat and pressure with an adequate forming machine such as an extruding machine; stamping the formed product to the required shape; smoothing the surface and the side face of stamped product; and then heating the stamped product within a heating device, to thereby obtain the complete friction member. The percents (%) of the following Examples and Comparison Examples are by weight.

EXAMPLE 1

Brass fiber of 40% having 0.2 mm diameter and 4 mm length, phenolic resins of 7% of powder state and 3% of liquid state, 6% of rubber dust, cashew dust of 6%, 11% of graphite powder, 18% of barium sulfate, 5% of a copper powder and 4% of an alumina, are placed and sufficiently mixed with a Henschel Mixer.

The mixed product was formed with a compression molding machine at 170° C. under 300 kg/cm² for 10 minutes, and simultaneously contacted with the back metal by the phenolic adhesive agent into the metal mold. The formed product was then heated with the heating device at 270° C. for 2.5 hours.

The heated product was cooled at room temperature, and the surface and the side face of the cooled product smoothed, to thereby obtain the complete friction member.

EXAMPLE 2

Brass fiber of 60% having 0.2 mm diameter and 4 mm length, phenolic resins of 7% of powder state and 3% of liquid state, 3% of rubber dust, 3% of cashew dast, 11% of graphite powder, 9% of the barium sulfate, and 4% of alumina were placed and mixed sufficiently with the Henschel Mixer, and then the complete friction member was obtained in the same manner of Example 1.

COMPARISON EXAMPLE 1

The complete friction member was obtained in the same manner of Example 1, except 40% of a steel fiber of soft hardness having 0.2 mm diameter and 4 mm length, was used for 40% of the brass fiber as the base material of the friction member.

COMPARISON EXAMPLE 2

The complete friction member was obtained in the same manner of Example 2, except 60% of the steel fiber having 0.2 mm of diameter and 4 mm length was used for 60% of the brass fiber as the base material.

The friction members obtained by Examples 1-2, and Comparison Example 1, 2 were tested.

The rate of wear valve is measured by a testing machine of frictional material based upn SAEJ661a. The value of the friction coefficient valve is measured by a dynamometer on the frictional surface of the type used for the brake system of a passenger car, based upon JASO 6914.

The testing result mentioned above is shown in FIG. 1.

In FIG. 1, the friction coefficient and wear rate of the embodiment of the invention disclosed in Example 1 are represented by the black triangles and white triangles, respectively. The friction coefficient and wear rate of the embodiment of the invention disclosed in Example 2 are indicated by the white squares and black squares, respectively. The friction coefficient and wear rate of the first comparison example are indicated by the black circles and white circles, respectively. The friction coefficient and wear rate of the second comparison example are indicated by the upper curve marked with "x's" and the lower curve marked with "x's".

Figure 2:
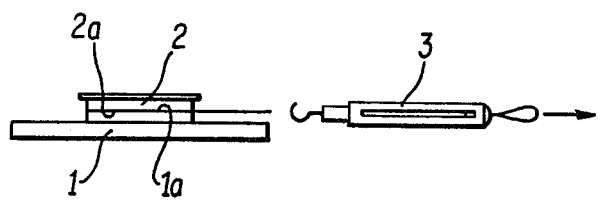
FIG. 2 is the front view showing the test method of anti-corrosion.

The test of anti-corrosion between the friction member and a disc member (a opponent member), is carried out as follows;

Pre-removing grease sufficiently from a frictional surface of a disc member with methanol;

piling a frictional surface 2a of the friction member 2 on frictional surface 1a of disc 1 as shown in FIG. 2;

standing the piled members at 20° C., at 80% humidity for 120 hours;

measuring the tensile strength needed to peel between 1a and 2a in the arrowed direction with spring scales as shown in FIG. 2.

The result of the anti-corrosion test is as follows concerning the tensile strength:

(1) 3.5 g/cm² in Example 1
(2) 4.0 g/cm² in Example 2
(3) 12.0 g/cm² in Comparison Example 1
(4) 16.5 g/cm² in Comparison Example 2

Corrosion on the surface of the friction members obtained by Example 1 and Example 2 scarely arised.

Corrosion on the surface of the friction members obtained by Comparison Example 1 and Comparison Example 2 was confirmed clearly.

FIG. 1 and the test of anti-corrosion clearly show that the friction members are improved and demonstrate excellent qualities concerning the ratio of wear at high temperature (more than 300° C.), anti-corrosion, and do not decrease the friction coefficient.

What is claimed as new and desired to be secured by Letters Patent of the United States is:

1. An asbestos-free friction member of the resin mold type consisting essentially of:
   10 to 70% by weight, based on the total composition, of brass fiber having a diameter of 0.05 to 0.5 mm and a length of 1 to 10 mm;
   6 to 15% by weight, based on the total composition, of phenolic resin as binder agent;
   20 to 80% by weight, based on the total composition, of an ingredient improving the frictional qualities selected from the group consisting of rubber dust, cashew dust, graphite, metal sulfide, metal oxide and metal powder; and
   less than 30% by weight, based on the total composition, of a filler selected from the group consisting of calcium carbonate and silica.

2. The friction member according to claim 1, wherein said brass fiber has a length of 2 to 7 mm.

3. The friction member according to claim 2, wherein said brass fiber has a length of 3 to 6 mm.

4. The friction member according to claim 1, wherein the shape of said brass fiber is a trapezoid.

5. The friction member according to claim 1, wherein the brass fiber is present in an amount of 30 to 60% by the weight and the phenolic resin is present in an amount of 8 to 13% by weight.

6. The friction member according to claim 5, wherein the brass fiber is present in an amount of 40 to 50% by weight and the phenolic resin is present in an amount of 9 to 11% by weight.

* * * * *

UNITED STATES PATENT AND TRADEMARK OFFICE
CERTIFICATE OF CORRECTION

PATENT NO. : 4,420,067

DATED : December 13, 1983

INVENTOR(S) : Yamamoto et al

It is certified that error appears in the above-identified patent and that said Letters Patent is hereby corrected as shown below:

Column 1, line 63, change "water" to -- wear --;

Column 3, line 58, change "valve" to -- value --;

line 60, change "valve" to -- value --;

Column 4, line 62, delete "the" (first occurrence).

Signed and Sealed this

Thirty-first Day of July 1984

[SEAL]

Attest:

GERALD J. MOSSINGHOFF

Attesting Officer      Commissioner of Patents and Trademarks